United States Patent [19]

Mellert

[11] Patent Number: 4,767,395

[45] Date of Patent: Aug. 30, 1988

[54] CENTRIFUGAL GREASE REMOVER/ABSORBER FOR FOODS

[76] Inventor: Richard G. Mellert, 1161 Maurice Ave., Clark, N.J. 07066

[21] Appl. No.: 137,741

[22] Filed: Dec. 24, 1987

[51] Int. Cl.$^4$ ............................................. B04B 15/02
[52] U.S. Cl. ........................................ 494/13; 494/36; 494/60
[58] Field of Search .................... 494/60, 12, 13, 10, 494/11, 85, 14, 36, 26, 144, 146; 210/360.1, 781, 782; 99/483, 485, 348

[56] References Cited

U.S. PATENT DOCUMENTS

| | | | |
|---|---|---|---|
| 3,824,701 | 7/1974 | Norquist | 494/26 |
| 3,860,166 | 1/1975 | Anderson | 494/13 |
| 3,916,152 | 10/1975 | Hinman | 494/13 |
| 4,196,844 | 4/1980 | Jacobson | 494/12 |
| 4,533,344 | 8/1985 | Gunnewig | 494/36 |
| 4,693,702 | 9/1987 | Carson | 494/13 |

*Primary Examiner*—Robert W. Jenkins
*Attorney, Agent, or Firm*—H. Jay Spiegel

[57] ABSTRACT

Disclosed herein is a device designed to remove and absorb grease from foods including a basket mounted in a chamber and designed to receive food products. The basket is rotatably mounted on the drive shaft of a motor for rotation at high enough speeds to cause grease to be removed from foods by centrifugal force. The basket is mounted in a chamber which may also have contained therein a heating device such as, for example, heat lamps. Furthermore, a disposable pad is removably mounted in the basket prior to insertion of the food products with the disposable pad being designed to absorb grease removed from the food by centrifugal force while preventing transfer of the grease to the basket walls.

7 Claims, 1 Drawing Sheet

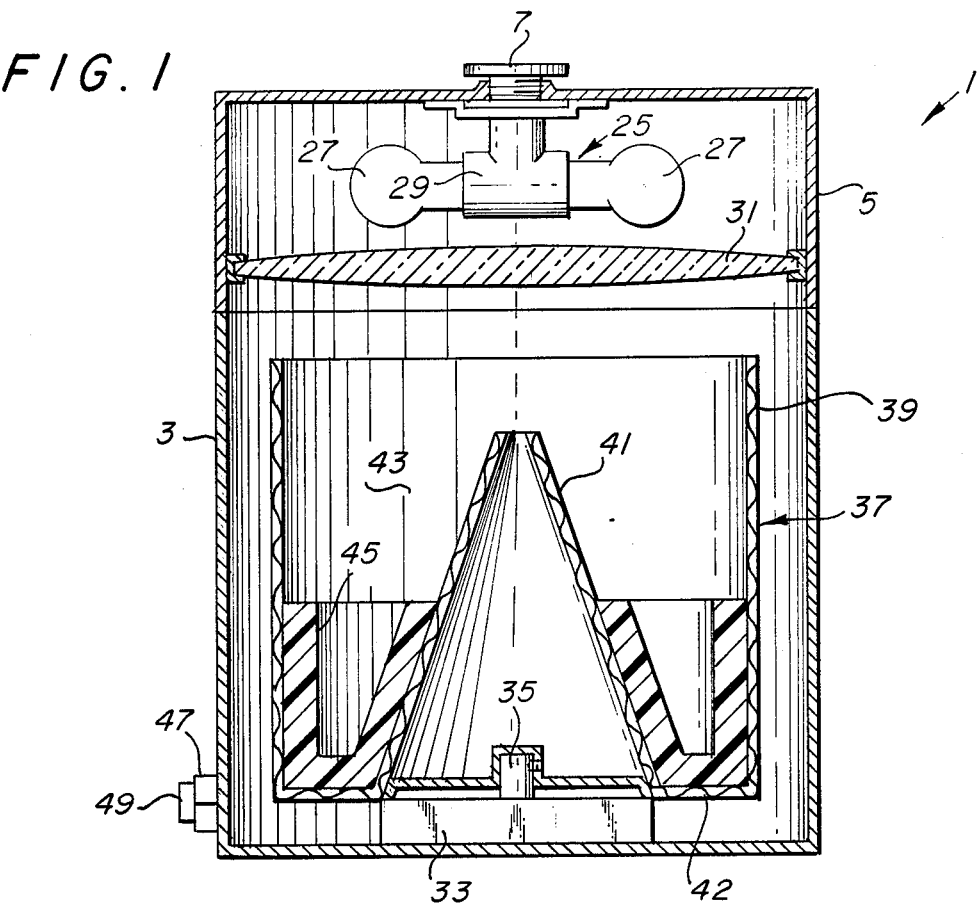
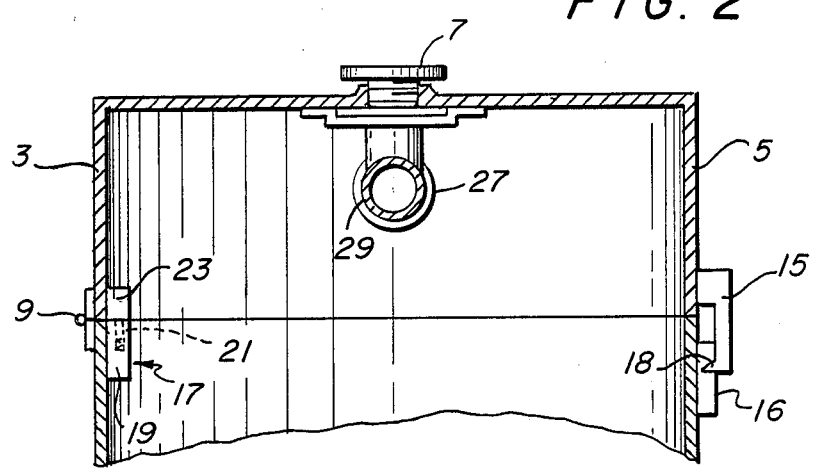
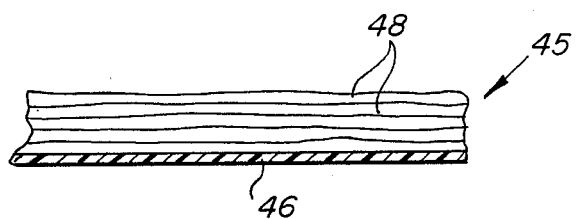

CENTRIFUGAL GREASE REMOVER/ABSORBER FOR FOODS

BACKGROUND OF THE INVENTION

The present invention relates to a centrifugal grease remover/absorber for foods. Centrifugal separators are well known in the prior art. However, Applicant is unaware of any teaching of a centrifugal separating device including the provision of removable grease absorbing pads in the spinning basket along with the inclusion of a heating means within the chamber.

The following prior art is known to Applicant:

U.S. Pat. No. 3,824,701 to Norquist discloses the concept of a centrifugal dryer for small articles including a chamber having a plurality of holes therein. As disclosed therein, the top of the housing is completely open to allow air intake as compared to the sealed chamber of the present invention. Furthermore, there is no teaching or suggestion in Norquist of heating means or grease absorbing pad structure.

U.S. Pat No. 4,533,344 to Gunnewig discloses the concept of a centrifugal separator having a self-emptying drum and an annular screen 17. The screen 17 performs no absorbing function nor does the separator include any suggestion or teaching of heating means.

SUMMARY OF THE INVENTION

The present invention overcomes the deficiencies found in prior art devices and provides an improved centrifugal separating device specifically designed to be utilized to remove and absorb grease from food products. The present invention includes the following interrelated aspects and features:

(a) in the first aspect, the device includes an outer housing having mounted therein a drive motor having a rotary shaft on which may be detachably connected a basket which is upwardly open.

(b) The basket has removably placed therein a grease absorbing pad structure designed to hug the walls of the basket in the areas thereof where food products are to be placed. In the preferred embodiment, the basket has cylindrical outer walls and a substantially conical inner annular wall.

(c) The chamber is closed by a pivotable cover having mounted therein heating means such as, for example, heat lamps which, when the cover is closed, are separated from the basket by a protective lens structure mounted in the cover.

(d) The cover has incorporated therewith a switch device which deactivates the motor whenever the cover is opened to prevent injury. Furthermore, a latch is provided to keep the cover securely closed.

Accordingly, it is a first object of the present invention to provide an improved centrifugal grease remover for foods.

It is a further object of the present invention to provide such a device including a rotary basket having removably placed therein a grease absorbing pad.

It is still a further object of the present invention to provide such a device including heating means within the chamber to keep the food products warm while the device is operating.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a cross sectional view through the present invention.

FIG. 2 shows a further cross sectional view rotated from the view of FIG. 1 and including further details of the interrelationship between the cover and housing of the device.

FIG. 3 shows a cross sectional view through a portion of the disposable absorbent pad.

SPECIFIC DESCRIPTION OF THE PREFERRED EMBODIMENT

With reference first to FIG. 1, it is seen that the invention 1 includes a housing 3, a cover 5 mounted on the housing 3 and a knob 7 on the cover 5 facilitating opening and closing thereof.

With reference to FIG. 2, it is seen that the cover 5 is pivotably mounted on the housing 3 by virtue of a hinge 9. A latch including a member 11 with a recess 13 therein is mounted on the housing 3, and a catch 15 designed to maintain a closed position of the cover 5 is mounted on the cover 5. Furthermore, a micro-switch 17 including a switch housing 19 having a plunger 21 extending upwardly therefrom interacts with a block 23 mounted on an inside wall of the cover 5 so that when the cover 5 is closed, the block 23 will be depress the plunger 21 maintaining the switch 17 in a closed position. Whenever the cover 5 is opened, the block 23 moves away from the plunger 21 which then moves upwardly responsive to spring force applied thereon to open the switch 17 and prevent the device 1 from operating.

As seen in FIG. 1, the cover 5 has mounted therein heating means 25 which in the example shown comprises two heating lamps 27 mounted in a socket 29 interconnected into the electrical circuitry of the device 1 for operation when the cover 5 is closed. A lens 31 is provided in the cover to protect the housing 3 should one of the lamps 27 shatter.

With reference back to FIG. 1, it is seen that contained within the housing 3 is a drive motor 33 having an operating shaft 35 extending upwardly therefrom. Detachably coupled to the operating shaft 35 is a basket 37 having a substantially cylindrical outer wall 39 and a substantially conical inner wall 41 defining therebetween an internal chamber 43 which is upwardly open.

Removably mounted within the chamber 43 is a grease absorbing pad 45 best seen in FIG. 3 to include a bottom layer 46 which is fluid impervious and may be made of a material such as, for example, plastic, and a plurality of fluid absorbing layers 48 mounted above the fluid impervious layer 46. In the preferred embodiment, the fluid impervious layer 46 of the pad 45 lies against the wall 39, 41 and the bottom wall 42 of the basket 37 and covers sufficient areas of these walls so that all food products placed within the basket 37 will always rest on the pad 45.

As seen in FIG. 1, a control 47 is mounted on the housing 3 including a control knob 49 which may control the speed of operation of the motor 33 either through a rheostat device allowing infinite speed adjustments or through a stepped adjustment allowing only a finite number of fixed speeds for the motor. As stated above, the system will not operate when the cover 5 is in an open position by virture of the switch 17.

In the operation of the invention, when it is desired to remove grease from food products, the cover 5 is opened by unlatching the latch 11, 13, 15 and pivoting the cover 5 about the hinge 5. In such position, the switch 17 will be open preventing rotation of the basket 37. A fresh absorbent pad 45 is placed in the basket 37 in the position and orientation shown in FIG. 1 and thereafter the desired food products are placed in the basket resting on the absorbent pad structure.

The cover 5 is closed and latched so that the block 23 has depressed the plunger 21 of the switch 17 allowing the system to operate. The control 47, 49 is thereafter adjusted to the desired speed of rotation of the basket 37 through rotation of the shaft 35 of motor 33.

When the motor 33 is activated by the control 47, 49, the heating means 25 is automatically activated and is maintained in an activated condition so long as the motor 33 is operating. If desired, the control 47 may also include a timer mechanism which may be adjusted to any desired time period so that the device 1 may be deactivated after the basket 37 has rotated a predetermined amount of time. If desired, if such a mechanism is utilized, the system may be provided with circuitry allowing the heating means 25 to be maintained in an on position after the motor 33 has been stopped by the timer mechanism to maintain the foods in a warm condition until the user arrives. As is customary in cooking devices a timer mechanism may have incorporated therewith an alarm mechanism which activates when the time period has elapsed through audible or visual means, or both, to notify the user that the time period has elapsed.

As such, an invention has been disclosed in terms of a preferred embodiment thereof which fulfills each and every one of the objects of the invention as set forth hereinabove. Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved separation device comprising:
   (a) a housing having an opening closeable by a cover;
   (b) a chamber in said housing having rotatably mounted therein a basket having a subchamber therein;
   (c) heating means for heating said chamber; and
   (d) an absorbent pad removably placed in said basket.

2. The invention of claim 1, wherein said basket includes a substantially cylindrical outer wall and a substantially conical inner wall, said pad being shaped to conform with and engage said walls.

3. The invention of claim 1, wherein said heating means comprises at least one light bulb mounted in said cover.

4. The invention of claim 3, wherein said cover includes a lens separating said bulb from said subchamber to protect said subchamber against bulb breakage.

5. The invention of claim 1, further including a motor having a drive shaft connected to said basket to rotate said basket, and an actuating switch electrically connected to said motor.

6. The invention of claim 5, further including a safety switch interposed between said cover and structure adjacent said opening, said safety switch only being closed when said cover is closed.

7. The invention of claim 1, wherein said pad includes a first layer made of a fluid impervious material and a plurality of further liquid absorbent layers, said first layer being adapted to engage said basket when said pad is placed therein.

* * * * *